United States Patent

Poturaev et al.

[11] Patent Number: 4,986,422
[45] Date of Patent: Jan. 22, 1991

[54] METHOD OF SCREENING SOLID MATERIALS AND APPARATUS FOR PERFORMING SAME

[76] Inventors: Valentin N. Poturaev, ulitsa Dzerzhinskogo, 33 g, kv. 10; Alfred G. Chervonenko, naberezhnava Pobedy, 48, kv. 299; Vladimir L. Morus, ulitsa Gladkova, 4-a, kv. 65; Viktor A. Lavrukhin, naberezhnaya Pobedy, 60, kv. 117, all of Dnepropetrovsk, U.S.S.R.

[21] Appl. No.: 396,471

[22] Filed: Aug. 18, 1989

[51] Int. Cl.$^5$ ............................................. B07D 1/30
[52] U.S. Cl. ..................................... 209/326; 209/261; 209/311; 209/341; 209/370
[58] Field of Search ............... 209/311, 315, 326, 332, 209/346, 360, 359, 254, 269, 261, 341, 370, 365.1, 331

[56] References Cited

U.S. PATENT DOCUMENTS

| | | | |
|---|---|---|---|
| 149,661 | 4/1874 | Jewell | 209/311 X |
| 802,563 | 10/1905 | Graham | 209/332 X |
| 2,853,191 | 9/1958 | Mogensen | 209/315 |
| 3,454,162 | 7/1969 | Cover | 209/269 |
| 3,520,408 | 9/1969 | Schlebusch | 209/346 X |

FOREIGN PATENT DOCUMENTS

| | | | |
|---|---|---|---|
| 2749498 | 5/1979 | Fed. Rep. of Germany | 209/311 |
| 975115 | 11/1982 | U.S.S.R. | |
| 975117 | 11/1982 | U.S.S.R. | |

Primary Examiner—Donald T. Hajec
Attorney, Agent, or Firm—Burgess, Ryan & Wayne

[57] ABSTRACT

The method of screening solid materials resides in feeding a solid material onto a sifting surface and imparting oscillations to surface under the action of an effort directed at an angle to the longitudinal axis of the sifting surface, providing for moving particles of the solid material directly engaging the sifting surface from the loading zone to the discharge zone at an acute angle to the vertical component of the applied effort, and limiting their displacement in a direction normal to the sifting surface. The apparatus for performing the method comprises a box carrying a vibrator and a support frame with a sieve secured thereto at an angle to a vertical plane including the longitudinal axis of the box, the sieve being associated with a screen for limiting the displacement of the solid material particles in a direction normal to the surface of the sieve.

9 Claims, 4 Drawing Sheets

METHOD OF SCREENING SOLID MATERIALS AND APPARATUS FOR PERFORMING SAME

FIELD OF THE INVENTION

The invention relates to techniques of classifying solid particulate materials into size fractions, and, more particularly, it relates to a method of screening solid materials and an apparatus capable of performing this method.

The present invention can be employed in the mining, ore-processing, metallurgical, chemical and food industries, as well as in mineral concentration technologies.

The invention can be successfully implemented for screening both dry solid particulate materials and particulate materials in the form of slurries.

BACKGROUND OF THE INVENTION

The recent trend of mining and processing considerable volumes of finely disseminated ores has brought about an increased demand for screening processes and corresponding plant capable of intensifying the operations of concentration and extraction of finely granular useful minerals. Thus, there has been created a situation of the growing significance and topicality of development work aimed at creating methods and devices stepping up the technological ratings of the screening process, such as its efficiency understood as the capacity of extracting fine size fractions from an initial solid material at high specific throughput and productivity.

There is known a method of hydraulic screening of solid materials (U.S. Pat. No. 3454162) including the steps of feeding a solid material as a slurry onto the sifting surfaces, oscillating this surface and supplying thereupon an auxiliary fluid.

There is also known an apparatus for hydraulic screening of solid materials (U.S. Pat. No. 3454162), comprising a box having mounted thereon a vibrator and a frame with the sieve secured thereto, a slurry feed pipe and pipes for supplying the auxiliary fluid.

However, these known method and apparatus are characterized by relatively low efficiency and specific throughput of the screening operation, particularly in classification of finely granular materials, which is caused, among other things, by the effects of surface tension of the fluid and adhesion among particles. This tends to form films on the sifting surface, closing its openings, whereas the material itself tends to form lumps or clods obstructing the progress of fine particles towards the sifting surface and through its openings, so that the process ratings of the screening operation are adversely affected. Although the supplying of the auxiliary fluid prompts the breaking of these lumps or clods, this takes place only in the zones of interaction of the material with the jets of the auxiliary fluid, and with the material passing these zones relatively quickly, is of but little practical effect.

There is further known a method of screening solid materials (U.S. Pat. No. 975115), including the steps of feeding a solid material as a slurry onto the sifting surface of the screening apparatus, set at an inclination angle in the direction opposite to that of the progress of the solid phase of the slurry, oscillating this sifting surface, and supplying an auxiliary fluid thereupon.

There is also known an apparatus for screening solid materials (U.S. Pat. No. 975115), comprising a box having mounted thereon a vibrator and a frame with a sieve secured thereto, the loading end of the box being situated below the discharge end thereof and submerged in a receptacle with a liquid, and pipes feeding the slurry and the auxiliary fluid, overlying the sieve.

In this known apparatus the vibration of the box and of the sieve connected therewith excites oscillations of the slurry and of the liquid, yielding a fluidization effect. Although lessening the tendency of lump or cold formation on the sieve surface, this effect, however, opposes the passage of fine particles through the mesh of the sieve. The auxiliary fluid supplied onto the liquid-air interface zone of the sieve promotes the passage of the smaller size fraction of particles within this zone, but on the whole, the known method and apparatus fail to offer sufficiently high process ratings, as the efficient separation of the initial material into size fractions actually takes place only over the limited area of the liquid-air interface.

There is still further known a method of screening solid materials (U.S. Pat. No. 975117), including the steps of feeding a solid material onto the sifting surface of the screening apparatus and oscillating this surface by an effort applied at an acute angle to the longitudinal axis of the sifting surface, causing the motion of solid material particles in a direction normal to the sifting surface, and from the loading zone towards the discharge zone.

There is also known an apparatus for screening solid materials (U.S. Pat. No. 975117), comprising a box mounted on resilient suspension members, carrying thereon a vibrator and a support frame having a sieve secured thereto, associated with a pipe for feeding the solid material.

The last-mentioned known screening method and the apparatus capable of performing this method are more efficient than the previously discussed methods and apparatuses of the prior art, also in the screening of finely granular solid materials fed in the form of a slurry. This is due to the cyclic motion of the material over the sifting surface in both longitudinal and transverse directions, attained by reversing periodically the rotation of the unbalanced weights of the actuating vibrator. This manner of the motion of the solid material prompts disintegration of lumps or clods, enhancing the interaction of particles of the material with the sifting surface. However, the reversing of the rotation of the unbalanced weights of the vibrator results in the material moving in the longitudinal and transverse directions in its progress from the loading zone towards the discharge zone in discrete steps. By stepping up the time of interaction of the material with the sifting surface, this essentially upgrades the screening efficiency that can be as high as 97-99%; however, the specific throughput is cut by some 40%.

With this known method, the motion of the material particles over closed paths can take place only within a relatively thick layer of the material having an exposed surface. In case of a thin layer, the circulation effect is practically non-existent, which lowers the screening efficiency.

The operation of the known apparatus performing the last-described method of screening solid materials requires either the presence of an operator or the incorporation of an intricate automatic control system.

SUMMARY OF THE INVENTION

It is an object of the present invention to provide a method of screening solid materials and to create an apparatus capable of performing this method, which should offer high efficiency and specific throughput of the screening operation.

This and other objects are attained in a method of screening solid materials, including the steps of feeding a solid material onto the sifting surface of the screening apparatus and imparting to this surface oscillations directed under an effort at an acute angle to the longitudinal axis of the sifting surface, causing the motion of solid material particles in a direction normal to the sifting surface and from the loading zone towards the discharge zone, which method, in accordance with the invention, includes providing for the motion of solid material particles directly engaging the sifting surface from the loading zone towards the discharge zone at an acute angle to the vertical component of the effort applied, and limiting the motion of the solid material particles in a direction normal to the sifting surface by establishing the maximum value of the displacement of the particles in this direction, wherein all solid material particles are continuously moving from the loading zone towards the discharge zone along continuous helical paths, and the minimum value of this displacement equalling the double maximum size of the solid material particles.

It is expedient that the value of the acute angle between the direction of the motion of the solid material particles directly engaging the sifting surface and the vertical component of the applied effort should be set within a range from 17° to 60°.

The object of the present invention is also attained in an apparatus for screening solid materials, comprising a box mounted on resilient suspension members, carrying thereon a vibrator and a support frame having a sieve secured thereto, associated with a pipe for feeding a solid material, in which apparatus, in accordance with the invention, the sieve is arranged at an acute angle to a vertical plane including the longitudinal axis of the box, with a screen secured to the sieve for limiting the motion of the solid material particles in a direction normal to the surface of the sieve.

It is reasonable to mount the screen with respect to the sieve at an acute angle selectable from a range from a zero angle to the value of the angle between the sieve and a vertical plane including the longitudinal axis of the box.

It is expedient that the screen should have a plurality of openings made therethrough.

It is preferable that the sieve should be made of two portions arranged symmetrically with respect to the vertical plane including the longitudinal axis of the box, at an acute angle thereto, the screen being in the form of a V-shaped trough with the walls extending with respect to the respective portions of the sieve at an acute angle selectable from a range from a zero angle to the value of the angle between the sieve and the vertical plane including the longitudinal axis of the box.

The disclosed method of screening solid materials and the apparatus for performing this method provide for substantially enhancing the process ratings of the screening operation, namely, its efficiency and specific throughput.

The creation in the disclosed apparatus of the conditions where solid material particles move along continuous helical paths along the sieve steps up the frequency and intensity of interaction of the particles with the sieve.

The employment of the perforated screen for limiting the displacement of the solid material particles in a direction normal to the sieve surface and the sieve being in the form of two symmetrically arranged portions allow to substantially augment the throughput of the disclosed apparatus.

The disclosed method is also efficient in its implementation for screening solid materials supplied in the form of a slurry, as it is capable of breaking up adhesion links between particles of the solid material and precluding the formation of films closing the openings of the sifting surface.

BRIEF DESCRIPTION OF THE DRAWINGS

Other objects and advantages of the present invention will be made apparent in the following description of examples of implementations of the disclosed method and embodiments of the apparatus capable of performing this method, with reference being made to the accompanying drawings, wherein.

DESCRIPTION OF THE INVENTION

Figures 1, 2:
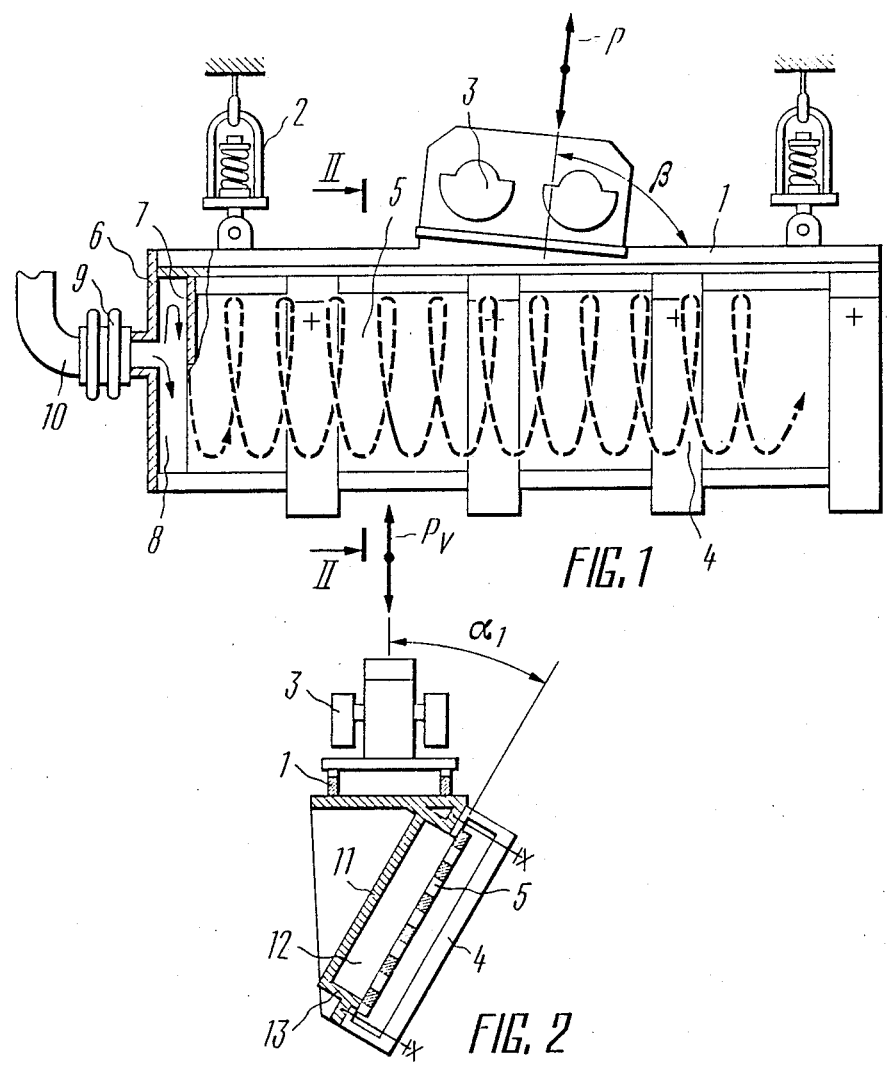
FIG. 1 is a schematic partly sectional general view of an apparatus for screening solid materials, capable of performing the method in accordance with the invention.
FIG. 2 is a sectional view taken on line II—II of FIG. 1.

The disclosed method of screening solid materials resides in supplying a solid material in the loading zone upon the sifting surface of the screening apparatus and driving this surface through harmonic oscillations under an effort applied at an acute angle $\beta$ to the longitudinal axis of the sifting surface.

This brings about vibration-induced motion of particles of the solid material along the sifting surface in a mode where the particles are tossed up, so that their interaction with the sifting surface takes place at moments when they are nearing their lowermost position, and the "flight" phase is towards their uppermost position.

To increase the pressure of the solid material particles upon the sifting surface, their displacement in a direction normal to the sifting surface is positively limited to create a restricted constrained environment of their "vibro-displacement", with the solid material particles directly engaging the sifting surface being directed from the loading zone towards the discharge zone at an acute angle $\alpha_1$ to the vertical component $P_v$ of the applied effort P.

Hence, the abovediscussed restrictions imposed on the displacement of the solid material particles result in the paths of their progress from the loading zone towards the discharge zone having a helical shape, with the motion of the solid material separated in the process into the finer and coarser fine fractions being effected in a thin layer under the conditions of constraint, not unlike circulations of a loose medium in a closed oscillated vessel. It is known that this environment brings about an increased pressure of the material particles upon the walls of the vessel, which is also true of a sifting surface. This is of essential importance in the screening of slurries, intensifying as it does the processes of breaking up the adhesion links between particles and films of water tending to span the openings in the sifting surface. At the same time, the conditions of passage of finer particles through the openings of the sifting surface are enhanced.

The maximum extent of the displacement of the solid material particles in the direction normal to the sifting surface is selected so that any standstill zones capable of forming at the central part of the layer of the circulating material should be eliminated, i.e. so that all particles should be engaged in the circulatory motion along helical paths from the loading zone towards the discharge zone. The minimum extent of the displacement of the solid material particles in this direction is taken to be the double value of the maximum particle size in the solid material.

The value of the angle $\alpha_1$ between the vertical component $P_v$ of the applied effort P and the direction of the motion of the solid material particles directly engaging the sifting surface has been found experimentally to be within a range from 17° to 60°. With $\alpha_1 > 17°$ the vibration-induced motion of the particles along helical paths ceases; within the range from 17° to 25° the circulation velocity observed is at its highest; within the range from 25° to 60° the velocity of circulation somewhat declines, but the circulatory motion is particularly stable; with the angle in excess of 60° the circulatory motion becomes unstable, and with $\alpha_1 > 75°$ it ceases altogether.

Thus, with the solid material particles moving from the loading zone to the discharge zone along helical paths, the frequency and intensity of interaction of the particles with the sifting surface are enhanced, stepping up the efficiency and specific throughput of the method.

The apparatus for screening solid materials, embodying the invention and capable of performing the disclosed method, comprises a case or box 1 (FIG. 1) mounted on resilient suspension members 2 and carrying thereon a vibrator 3 and a support frame 4 with a sieve 5 secured thereto. The resilient suspension members 2 are attached to a supporting structure. The box 1 has an end wall 6 and a vertical baffle partition 7 jointly defining an inlet chamber 8 connected through a bellows 9 to a pipe 10 for feeding the solid material to be screened.

The sieve 5 is arranged at an acute angle $\alpha_1$ (FIG. 2) to a vertical plane including the longitudinal axis of the box 1. Extending parallel with the sieve 5 throughout its length is a screen 11 for limiting the displacement of the solid material particles in a direction normal to the surface of the sieve 5, by defining with the sieve 5 a channel 12 for the progress of the solid material being screened. The sieve 5 is provided with side boards 13 which in the embodiment being described are made integral with the screen 11.

Figure 3:
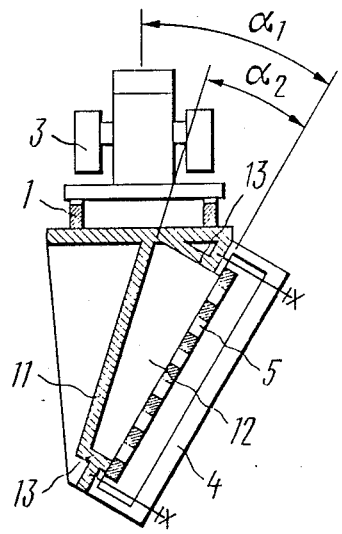
FIG. 3 is a view similar to that of FIG. 2, of the embodiment of the disclosed apparatus wherein the screen extends at an acute angle with respect to the sieve.

In another embodiment of the apparatus, illustrated in FIG. 3, the screen 11 extends at an acute angle $\alpha_2$, with $0 \leq \alpha_2 < \alpha_1$, so that the channel 12 is of a varying height.

Figure 4:
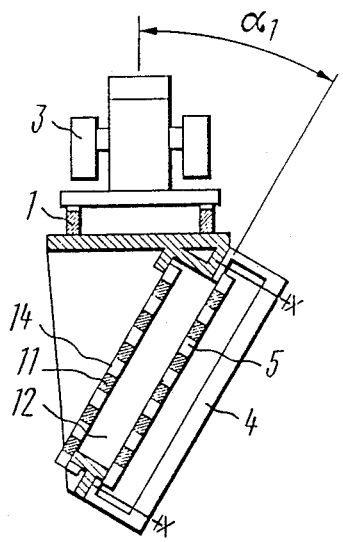
FIG. 4 is a view similar to FIG. 3, of the embodiment wherein the screen is perforated and extends parallel with the sieve.

To step up the throughput of the apparatus, it may be expedient for the screen 11 to be perforated as shown in FIG. 4, i.e. to have a plurality of openings 14 made therethrough, the screen 11 being either parallel with the sieve 5, as shown in FIG. 4, or extending at an acute angle $\alpha_2$ thereto (this modification is not shown in the appended drawings).

Figure 5:
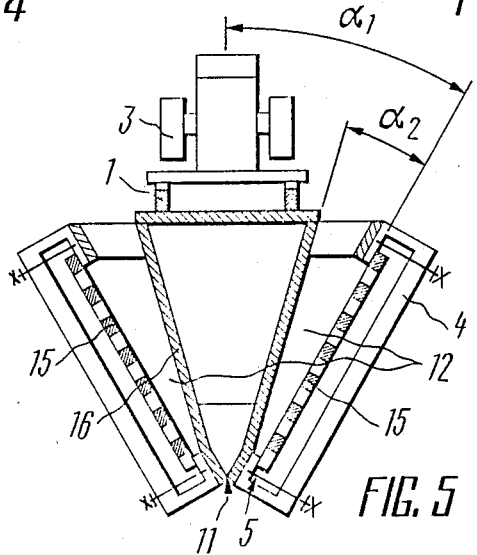
FIG. 5 is a view similar to FIG. 3, of the embodiment wherein the sieve is made of two symmetrical portions and the screen is in the form of a V-shaped trough.
Figure 7:
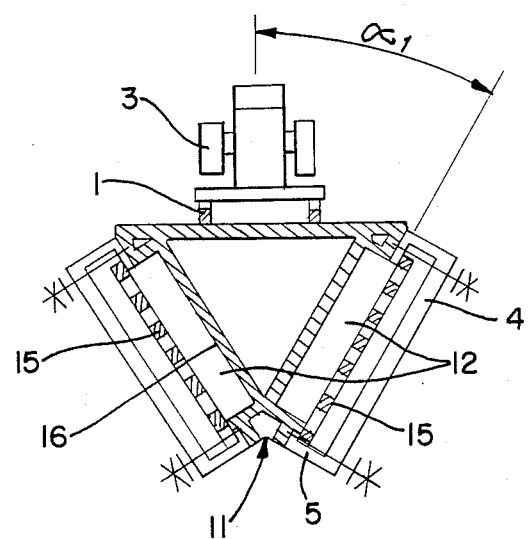
FIG. 7 is a sectional view of a device similar to the device shown in FIG. 5 with the screens parallel to the surface of the sieves.

Another possibility of stepping up the throughput of the disclosed apparatus is to have the sieve 5 made of two parts 15 (FIG. 5) symmetrically arranged with respect to the vertical plane including the longitudinal axis of the box 1, extending at an angle $\alpha_1$ to this plane. In this embodiment the screen 11 is in the form of a V-shaped trough, its walls 16 extending either parallel with the respective portions 15 of the sieve 5 (this modification is shown in FIG. 7 of the appended drawings), or at an angle $\alpha_2$ thereto, defining therewith the respective generally V-shaped channels 12 (this modification is shown in FIG. 5 of the appended drawings).

Figure 6A:
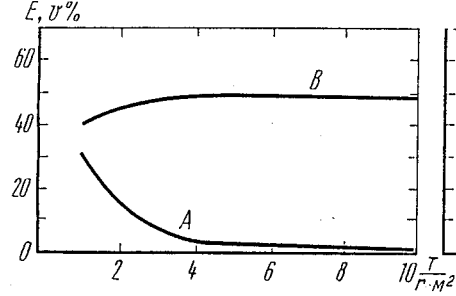
FIG. 6 a, b, c presents diagrams illustrating the dependence of the efficiency E of the screening operation and the content $\theta$ of fine particles in the coarse size fraction of the screened solid material on the specific throughput of the apparatus.
Figure 6B:
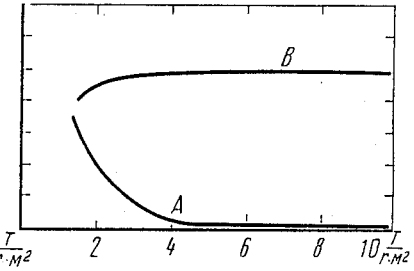
Figure 6C:
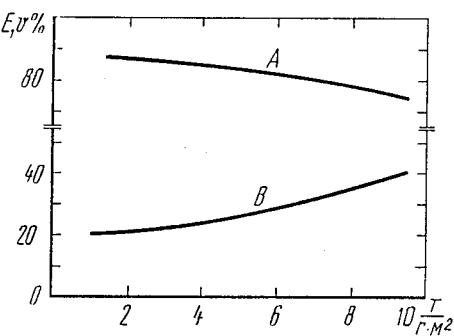

For the essence and effect of the invention to be better understood, FIGS. 6 a, b, c presents diagrams illustrating the dependence of the screening efficiency E (curve A) and of the content $\theta$ (curve B) of fine particles in the coarser size fraction after the screening operation on the specific throughput.

The disclosed apparatus for screening solid materials is operated as follows.

The vibrator 3 (FIG. 1) is energized to impart oscillations to the box 1, support frame 4 and sieve 5 under an effort P directed at an acute angle $\beta$ to the longitudinal axis of the box 1.

At the same time, the solid material to be screened, e.g. in the form of a slurry, is fed via the pipe 10 and bellows 9 into the inlet chamber 8. Upon having been deflected by the baffle partition 7, the material is guided into the channel 12 (FIG. 2) onto the lower part of the sieve 5. In applications where the solid material is supplied as a slurry, in this zone it becomes actively dehydrated. As the inlet chamber 8 (FIG. 1) fills up and the material enters the channel 12 (FIG. 2), it becomes compacted and starts moving along the surface of the sieve 5. Owing to the supply head in the feed pipe 10 (FIG. 1) and to the sieve 5 extending at an angle $\alpha_1$ (FIG. 2) to the vertical plane including the longitudinal axis of the box 1, providing for the motion of the solid material particles directly engaging the surface of the sieve 5 at the angle $\alpha_1$ to the vertical component $P_v$ (FIG. 1) of the applied effort P, and also owing to the limitation of the displacement of the particles in a direction normal to the surface of the sieve 5 by the incorporation of the screen 11 (FIG. 2), the solid material particles advance in the environment of constraint along helical paths (indicated by dash lines in FIG. 1) from the loading end of the sieve 5 towards the discharge end. This vibration-induced progress of the solid material is accompanied by its separation into coarser and finer size fractions.

This motion of the solid material particles along helical paths in the environment of constraint multiplies the number of acts of interaction of finer particles with the sieve 5, steps up the effort applied by the layer of the moving material to these finer particles in their passage through the openings of the sieve 5, and also completely eliminates the effects of adhesion among the particles and the probability of films forming over the openings of the sieve 5.

When the screen 11 extends with respect to the sieve 5 at an angle $\alpha_2$, which increases the cross-sectional area of the channel 12, a higher specific throughput is attained with the same screening quality indicator $\theta$ as in the embodiment where the screen 11 extends parallel with the sieve 5.

The throughput of the disclosed apparatus can be increased nearly twice with the same overall dimensions and the same power of the vibrator 3 as in the previously described embodiments, by employing the screen 11 with the perforations 14 (FIG. 4), so that the screen 11 functions as the other sieve, with the screening taking place both through the sieve 5 and the openings 14 of the screen 11 which retains its function of limiting the displacement of particles in a direction normal to the surface of the sieve 5.

Yet another possibility of stepping up the throughput of the disclosed apparatus is presented by making the sieve 5 of the two portions 15 (FIG. 5), with the screen 11 being of the corresponding abovedescribed shape. However, in this case the weight of the apparatus is increased, and a more powerful vibrator 3 is required. In this embodiment, the separation of the solid material into the size fractions and its progress along the surface of the sieve 5 take place similarly to the process described above.

An example to follow is another illustration of the essence of the invention and its advantages.

EXAMPLE

Crushed granite was screened, having the following content of the particle size classes:

| Classes, mm | −2 + 1.65 | −1.65 + 1.2 | −1.2 + 1.0 | −1.0 + 0.5 |
|---|---|---|---|---|
| Their content, % | 31.5 | 18.5 | 17.5 | 32.5 |

It can be seen that the material features an increased content (62.5%) of the classes whose particle size is 0.75 to 1.5 of the critical screening (separation) size, as well as the absence of size classes with particles finer than 0.5 mm.

The screening was performed by the three methods:
the method of the prior art disclosed in (U.S. Pat. No. 3454162);
the method of the prior art disclosed in (U.S. Pat. No. 874214);
the disclosed method in accordance with the present invention, with the sieve made of two portions, as shown in FIG. 5.

The outcome of the analysis of the results of the screening by the three methods is illustrated, respectively, in the diagrams of FIG. 6a, b, c.

It can be seen from these diagrams (FIG. 6a, b) that the maximum efficiency E of the screening operation (about 30%) with the methods of the prior art is attained with the specific throughput not exceeding 1.5 t/h.m²; with the specific throughput increased any further, the efficiency E of the screening operation drops severely to 0-5% on the average, while the content $\theta$ of finer particles in the screened coarser size fraction comes close to their content in the initial material, which attests to practically nil extraction of the finer size fraction.

The maximum values of the efficiency E (80-90%) are attained in the method of the present invention (FIG. 6c) with the specific throughput being 2.5 times as great as with the methods of the prior art, and with the specific throughput of 5 t/h.m² the value of the efficiency E is about 80%, which is 10 times higher than the comparable indicator of the methods of the prior art with the same specific throughput.

It can be seen that the herein disclosed screening method and apparatus performing this method are more efficient and productive than the prior art.

What is claimed is:

1. A method of screening solid materials, including:
   feeding a particulate solid material onto a sifting surface of a screening apparatus, the screening apparatus having a loading zone and a discharge zone;
   imparting oscillations to said sifting surface under the action of an effort directed at an acute angle $\beta$ to the longitudinal axis of said sifting surface, for moving particles of the solid material from the loading zone to the discharge zone and in a direction normal to said sifting surface;
   moving the particles of the solid materials directly engaging said sifting surface, from the loading zone to the discharge zone, at an acute angle $\alpha$, with respect to a vertical component of said effort;
   limiting the extent of displacement of the solid material particles in the direction normal to said sifting surface;
   setting a maximum value of the extent of displacement of the particles of the solid material such that the particles move from the loading zone to the discharge zone along substantially continuous helical paths;
   setting a minimum value of the extent of displacement of the particles substantially equal to double the value of the maximum particle size of the solid material being screened.

2. A method as set forth in claim 1, wherein the value of said acute angle $\alpha$, between the direction of the motion of the solid material particles directly engaging said sifting surface and said vertical component of said effort is selected from a range from 17° to 60°.

3. An apparatus for screening particulate solid materials, comprising:
   a support structure;
   resilient suspension members attached to said support structure;
   a box having a longitudinal axis, associated with said suspension members the box having a loading zone and a discharge zone arranged adjacent the ends of the box, along the longitudinal axis;
   vibrator means arranged on said box to impose oscillation to the box at an acute angle $\beta$ to the longitudinal axis of the box, to move the particles from the loading zone to the discharge zone;
   a support frame mounted on said box;
   a sieve secured to said support frame at an acute angle $\alpha$, to a vertical plane including said longitudinal axis of said box;
   a screen for limiting the displacement of particles of a solid material in a direction normal to the surface of said sieve, arranged in said box to provide a channel having a closed cross-sectional shape for passage of the particles from the loading zone to the discharge zone.

4. An apparatus as set forth in claim 3, wherein said screen is mounted parallel with said sieve.

5. An apparatus as set forth in claim 3, wherein said screen is mounted with respect to said sieve at an acute angle $a_2$ smaller than said angle $a_1$ between said sieve and the vertical plane including said longitudinal axis of said box.

6. An apparatus as set forth in claim 4, wherein said screen has a plurality of openings made therethrough.

7. An apparatus as set forth in claim 5, wherein said screen has a plurality of openings made therethrough.

8. An apparatus as set forth in claim 3, wherein said sieve includes two portions arranged symmetrically with respect to the vertical plane including said longitudinal axis of said box, and at said acute angle $a_1$ to said plane, said screen being in the form of a V-shaped trough having walls extending substantially parallel with respect to said portions of said sieve.

9. An apparatus as set forth in claim 3, wherein said sieve includes two portions arranged symmetrically with respect to the vertical plane including said longitudinal axis of said box, and at said acute angle $\alpha_1$ to said plane, said screen being in the form of a V-shaped trough, having walls extending with respect to said portions of said sieve, at an acute angle $\alpha_2$, smaller than said angle $\alpha_1$ between said portions of said sieve and the vertical plane including said longitudinal axis of said box.

* * * * *